United States Patent [19]

Lenoski

[11] Patent Number: 4,825,356
[45] Date of Patent: Apr. 25, 1989

[54] MICROCODED MICROPROCESSOR WITH SHARED RAM

[75] Inventor: Daniel E. Lenoski, Mountain View, Calif.

[73] Assignee: Tandem Computers Incorporated, Cupertino, Calif.

[21] Appl. No.: 31,477

[22] Filed: Mar. 27, 1987

[51] Int. Cl.[4] .............................................. G06F 9/30
[52] U.S. Cl. ...................................................... 364/200
[58] Field of Search ... 364/200 MS File, 900 MS File

[56] References Cited

U.S. PATENT DOCUMENTS

| | | |
|---|---|---|
| 3,859,636 | 1/1975 | Cook ................................... 364/200 |
| 3,886,523 | 5/1975 | Ferguson et al. .................. 364/200 |
| 4,390,946 | 6/1983 | Lane ..................................... 364/200 |
| 4,586,127 | 4/1986 | Horvath .............................. 364/200 |

Primary Examiner—Eddie P. Chan
Attorney, Agent, or Firm—Townsend & Townsend

[57] ABSTRACT

A processor system utilizing a single shared RAM array, for storing microcode and other function data, with the shared array coupled to the processor by a single shared ADR/DATA bus. In one embodiment, an on-board ROM stores selected lines of microcode and a ROM accessing system supplies microcode from the ROM when the shared RAM array is busy performing some other RAM function.

2 Claims, 3 Drawing Sheets

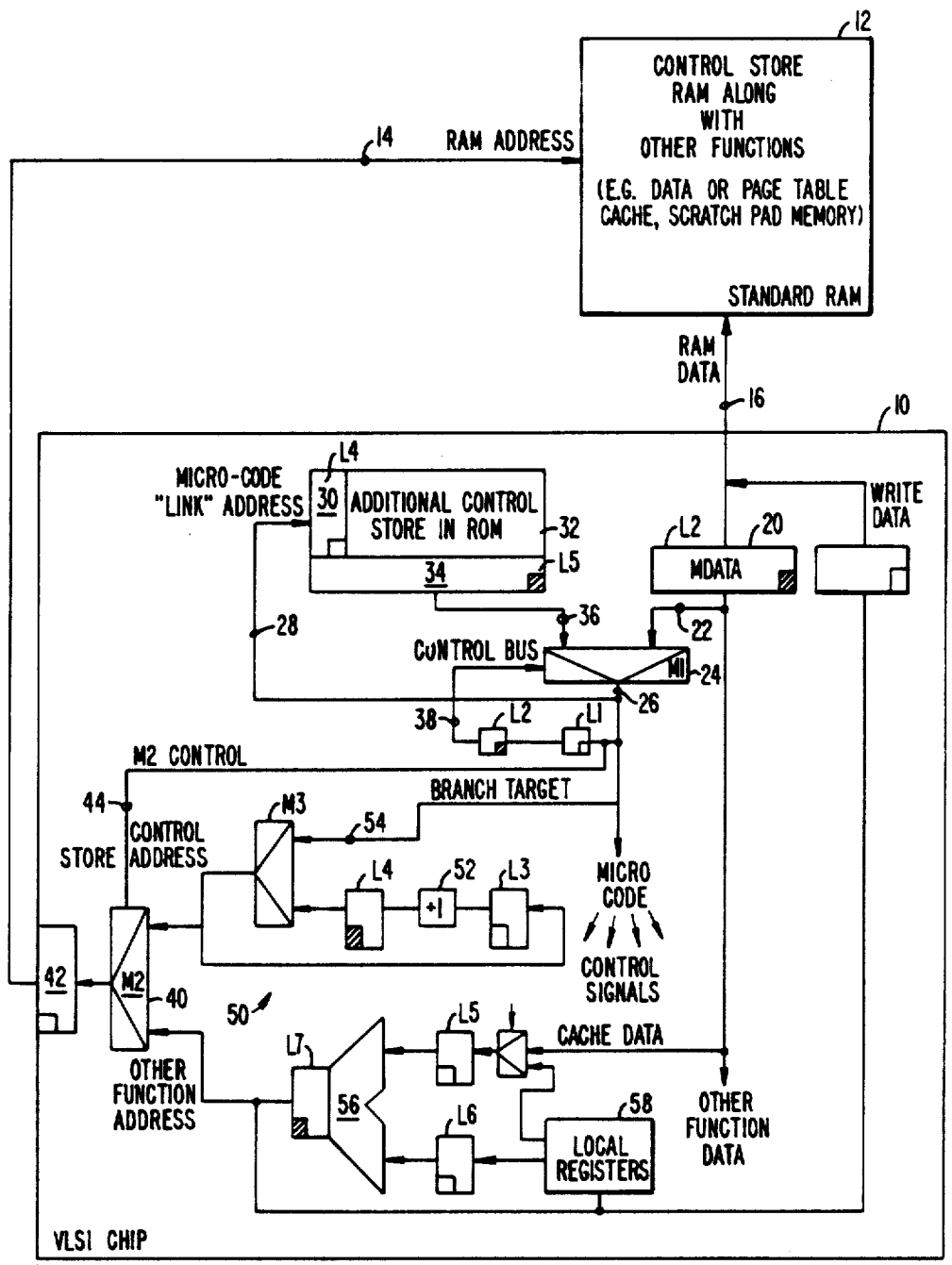
FIG._1.

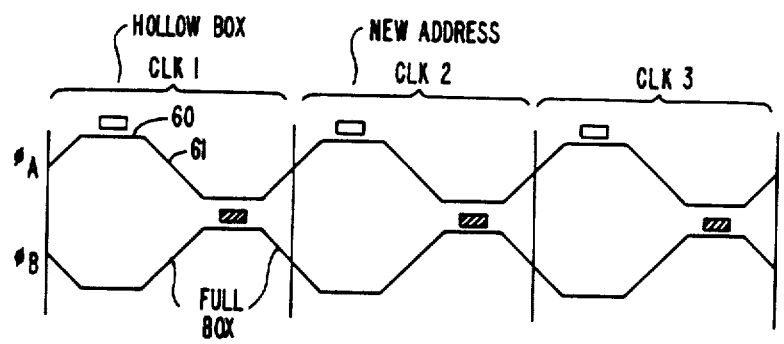
FIG._2.
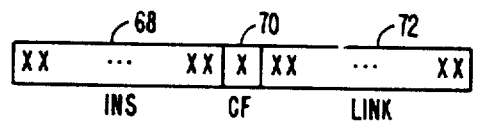
FIG._3.
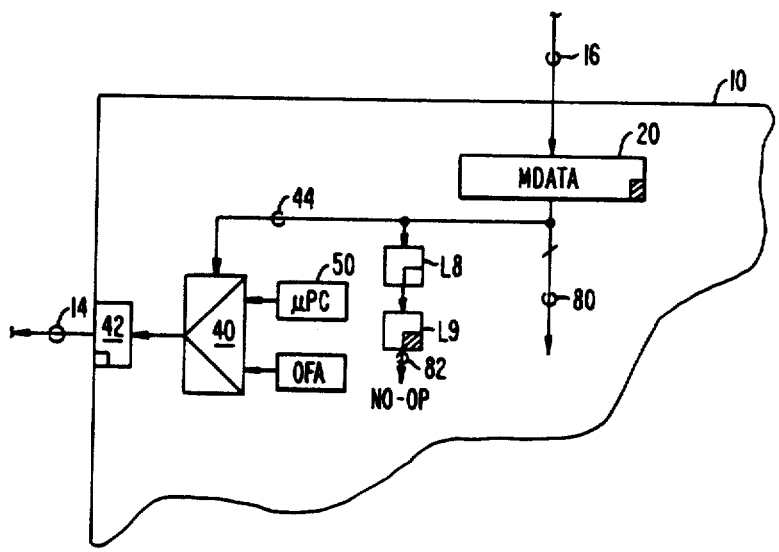
FIG._4.

NON-SHARED CONFIGURATION

| | ACCESS | ACCESS | ACCESS | ACCESS | ACCESS | ACCESS | ACCESS | ACCESS | | |
|---|---|---|---|---|---|---|---|---|---|---|
| EXTERNAL μCODE ADDR/DATA | PC | PC+1 | PC+2 | PC+3 | PC+4 | PC+5 | PC+6 | PC+7 | PC+8 | |
| EXTERNAL MEM ADDR/DATA | DON'T CARE | DON'T CARE | READ DATA CACHE | DON'T CARE | DON'T CARE | DON'T CARE | READ PT CACHE | WRITE DATA CACHE | DON'T CARE | |
| MICRO-CODE USED | | GEN CACHE ADR | NOP | INC COUNTER | ADD CACHE DATA TO ACC | GEN STORE ADR | ACCUM TO WRITE DATA | | START NEXT OP | |

SHARED, NO ROM CONFIGURATION

| | ACCESS | ACCESS | READ DATA CACHE | ACCESS | ACCESS | ACCESS | ACCESS | READ PT CACHE | ACCESS | WRITE DATA CACHE | ACCESS | |
|---|---|---|---|---|---|---|---|---|---|---|---|---|
| EXTERNAL ADDR/DATA | PC | PC+1 | | PC+3 | PC+4 | PC+5 | PC+6 | | PC+8 | | PC+10 | |
| MICRO-CODE USED | | GEN CACHE ADR | NOP | NOP-NO μCODE | INC COUNTER | ADD CACHE DATA TO ACC | GEN STORE ADR | ACCUM TO WRITE DATA | NOP -NO μCODE | NOP | NOP-NO μCODE | START NEXT OPERAT'N |

SHARED μRAM/μROM CONFIGURATION

| | ACCESS | ACCESS | READ DATA CACHE | ACCESS | ACCESS | ACCESS | READ PT CACHE | WRITE DATA CACHE | | | |
|---|---|---|---|---|---|---|---|---|---|---|---|
| EXTERNAL ADDR/DATA | PC | PC+1 | | PC+3 | PC+4 | PC+5 | | | PC+8 | PC+9 | |
| INTERNAL ROM ADDR/DATA | DON'T CARE | DON'T CARE | ACCESS ROM003 | DON'T CARE | DON'T CARE | DON'T CARE | ACCESS ROM010 | ACCESS ROM033 | DON'T CARE | | |
| MICRO-CODE USED | | GEN CACHE ADR | NOP | INC COUNTER | ADD CACHE DATA TO ACC | GEN STORE ADR | ACCUM TO WRITE DATA | | START NEXT OP | | |

FIG._5.

MICROCODED MICROPROCESSOR WITH SHARED RAM

BACKGROUND OF THE INVENTION

Generally, central processor units (CPUs) operate by executing a sequence of object macrocode instructions forming a program. These macroinstructions are named by mnemonic codes which refer to specific hardware elements and data transfers in the processor, e.g., "MOV" (move data from one location to another). These macroinstructions are stored in the form of binary codes in a digital memory.

When the processor receives a macroinstruction it is interpreted to generate control signals to control the operation of the various gates, counters, registers, and so forth comprising the hardware of the processor. In a microcoded processor the states of these control signals during a signal clock cycle, are encoded in a microinstruction. The microinstruction bits determine whether respective control lines carry high or low signals. Thus, the execution of a microinstruction sets the states of the control signals to the levels specified by the bits in the microinstruction. The macroinstruction may require a microprogram of sequential microinstruction for its execution. Typically, a microinstruction is much wider than a microinstruction because of the large number of control signals required to operate the processor.

In existing processor systems utilizing microcode, the macroprogram and microcode are stored in separate memory arrays. Additional RAM arrays are often utilized to perform other RAM functions, e.g., Data Cache, Page Table Cache. Separate memory arrays for the macroprogram and microcode are utilized because the efficient execution of the macroprogram may require, for example, that a line of microcode be accessed and that another RAM function be performed simultaneously.

Each memory array is connected to the processor by an address bus and a data bus. Typically, the address buses are on the order of 14 to 32 bits wide, the macrodata bus is on the order of 32 lines wide, and the microdata bus is on the order of 54 to 200 lines wide. Thus, the requirement of utilizing two memory arrays for microcode and macrocode requires a large amount of I/O hardware to be included in the processor. Further, each memory array requires additional hardware such as address, control buffers, and control timing logic.

Accordingly, the existing macro/micro instruction storage systems impose excessive hardware burdens that increases the complexity, size, and cost of the system.

SUMMARY OF THE INVENTION

The present invention is a system for utilizing a single RAM array as a control store for microcode, and as a memory for other functions such as, for example, memory cache, page table cache, and scratch pad. The single shared DATA/ADR bus reduces the number of I/O connections that must be designed into the processor and facilitates overall reduction of hardware.

In a preferred embodiment, selected microinstructions are stored in a ROM included on the processor. A ROM accessing system accesses a required microinstruction from the ROM for execution during a given clock cycle when the shared RAM array is performing some other function. Thus, the execution of the microprogram is not interrupted when the shared RAM is busy, thereby increasing the operating speed of the processor.

In an alternate embodiment, provision for generating a no-op signal is included to stop execution of the microprogram when the shared RAM array is performing some other RAM function. This embodiment is structurally simple, but may take longer to execute a microprogram than the embodiment including the onboard ROM.

According to a further aspect of the invention, each microinstruction, for use in the embodiment having onboard ROM, includes a control field for determining whether the next microinstruction is accessed from the shared RAM array or the onboard ROM and a link field for specifying the address in the ROM of the next microinstruction to be accessed from the onboard ROM.

Other features and advantages of the invention will be apparent in view of the drawings and the following detailed description.

BRIEF DESCRIPTION OF THE DRAWINGS

FIG. 1 is a schematic diagram of a preferred embodiment of the invention.

FIG. 2 is a timing diagram illustrating the dual-phase clock systems used in the preferred embodiment.

FIG. 3 is a schematic diagram depicting the organization of a microinstruction.

FIG. 4 is a schematic diagram of an alternate embodiment of the invention.

FIG. 5 is a timing diagram illustrating the operation of the invention.

DETAILED DESCRIPTION OF THE PREFERRED EMBODIMENT

Referring now to the drawings, where like reference numerals indicate identical or corresponding parts through the several views, FIG. 1 is a schematic diagram of a preferred embodiment of the invention.

In FIG. 1, a CPU system 10 is connected to a single RAM array 12 by a shared address bus 14 and a shared two-way data bus 16. The data bus 16 is coupled to the input port of an MDATA latch 20. The output port of the MDATA latch 20 is coupled to a RAM microinstruction bus 22. The RAM microinstruction bus is coupled to the first input port of multiplexer M1 24 having first and second input ports, and output port, and a control port. The output port of M1 24 is coupled to a microcode bus 26. A LINK bus 28 couples selected lines of the microcode output bus 26 to the input port of the address latch (L4) 30 of an onboard control store ROM 32. The output port of the ROM data latch 34 is coupled to the second input port of M1 24 by a ROM microcode data bus 36. A selected line of the microcode output bus 26 is connected to the M1 control port, via latches L1 and L2 by control line 38. Multiplexer M2 40 has an output port coupled to the input port of address latch 42. The output port of the address latch 42 is coupled to the RAM address port by the address bus 14. The control port of M2 40 is coupled to the selected line of the microcode output bus by M2 control line 44.

The above-described components are those required to implement the principles of the invention. The remainder of the components in FIG. 1 implement a standard microprocessor architecture and are included so that operative examples of the invention may be described.

A microprogram counter 50 includes a feedback loop comprising latch L3, incrementer 52, latch L4, and MUX M3 for generating sequential addresses. A branch target address is coupled to the second input port of MUX M3 to selected lines of the microcode output bus 26. Further, an ALU 56, local register 58, and latches L5, L6 and L7 are depicted connected in a standard manner.

The system utilizes a dual-phase clock signal to control the latches. The latches are level-sensitive latches with those latches including a hollow box driven by the A phase of the clock and those latches having a filled-in box driven by the B phase of the clock.

Referring to FIG. 2, the clock signal is arbitrarily defined to begin when the microinstruction address is latched into the ADR latch 42. Referring to the phase A signal, during clock cycle 1 the phase A latch is transparent, i.e., the output signals are the same as the input signals, when phase A is high 60. The input signals are latched, i.e., the output signals remain constant regardless of input signal changes, when the phase A signal falls 61. The phase B latches are similarly controlled by the phase B clock. Thus, data is latched into the phase A latches at the beginning of each clock cycle and held for the entire clock cycle. Data is latched into the phase B latches in the middle of each clock cycle and held for the latter half of one clock cycle and the beginning half of the succeeding clock cycle. The signals on the microcode output bus function to control the various multiplexers and the ALU during each clock cycle.

Referring now to FIG. 3, the format of a microinstruction is illustrated. Each microinstruction includes an instruction field 68 for generating the various control signals required to control the hardware on the processor, a control field 70, and a link field 72. The functions of the control and link fields 70 and 72 are described below.

An overview of the operation of the system will now be described. It is assumed that a microprogram interpreting some arbitrary macroinstruction is currently being executed in the processor. The microprogram controller 50 is generating a sequence of addresses to access successive location in the shared RAM array during successive clock cycles. The microinstructions of the microprogram are stored in these successive memory locations are thus being sequentially accessed for execution in the microprocessor system.

If the shared RAM array 12 is to be used for another function, such as a page table cache read or a data cache write, during a given clock cycle then the given microinstruction, i.e., the microinstruction that is to be accessed during the given clock cycle cannot be accessed from the shared RAM array 12 during the given clock cycle. In the present system, the required given microinstruction is accessed from the onboard ROM 32 during the given clock cycle.

The control field 70 in the preceding microinstruction, i.e., the microinstruction accessed during the clock cycle immediately preceding the given clock cycle, determines whether the given microinstruction is accessed from the shared RAM array 12 or from the onboard ROM 32. If the given microinstruction is to be accessed from the onboard ROM 32, then the link field 72 of the preceding microinstruction specifies the address in the onboard ROM 32 where the given microinstruction is stored.

Thus, the programmer must provide the required control and link fields 70 and 72 one clock cycle in advance of the given clock cycle to provide for a microinstruction access from the onboard ROM 32. Because the vast majority of the microinstructions will be accessed from the shared RAM 12, only a small subset of the microcode need be stored in the onboard ROM 32. The use of a direct microcode specified ROM address allows ROM lines to interleave the RAM lines independent of microcode branching. Thus, a "linked to" ROM overlays a line that otherwise would have come from the external RAM array 12, if that were possible.

As will be shown in more detail below, this shared ROM/RAM system is capable of performing with the same efficiency as a conventional system utilizing separate memory arrays for the macromode and other RAM functions and for storing the microcode.

A more detailed description of the operation of this system will now be described with reference to FIGS. 1, 2 and 3. The address (PC) of the preceding microinstruction is latched into address latch 42 during phase B of clock cycle 1 (FIG. 2).

During phase B of clock cycle 1, the preceding microinstruction is latched into the MDATA latch 20 and executed. Concurrently, the microprogram counter latches address (PC+1) into latch L4. The microinstruction is placed on the microcode output bus 26 via the RAM microcode data line 22 and the MUX M1 24. If the shared RAM array 12 is to perform another RAM function during the given clock cycle (CLK 2), then the control signal on the M2 control line 44 controls MUX M2 40 to transmit the other function address to the input port of address latch 42. Additionally, the control field bit for controlling MUX M1 is transmitted to the input port of latch L1 and the link field 72 is transmitted to the input port of the ROM address latch 30 by the link bus 28.

During phase A of clock cycle 2, the other function address is latched into the address latch 42, the link field is latched into the ROM address latch 30, the control field is latched into latch L1.

If the shared RAM array 12 is to perform another RAM function, e.g., a cache write operation, during clock cycle 2, then the link field specifies the address in ROM where the given microinstruction is stored. This link field accesses the given microinstruction from the onboard ROM 32.

During phase B of clock cycle 2 (the given clock cycle), the given microinstruction is latched into the ROM output latch 34 and the control field is latched into latch L2. The control field causes the multiplier M1 24 to couple the given microinstruction latched in the ROM output latch to the microcode output bus. Simultaneously, in the case of a write data cache operation, the data to be written is placed on RAM data bus 16. Additionally, during phase B of clock cycle 2 the program counter 50 generates address (PC 30 2).

Accordingly, the given microinstruction has been accessed from the onboard ROM 32 during clock cycle 2 while the shared RAM array 12 is performing some other RAM function. Similarly, the control and link fields 70 and 72 in the given microinstruction determine whether the next microinstruction is accessed from the shared RAM array 12 or the onboard ROM 32. The link capability is present independent of whether the microinstruction is accessed from the shared RAM array 12 or the onboard ROM 32. The use of explicit address for the ROM line stored in the onboard ROM 32 allows for sharing of ROm4M lines by different sequences of microcodes. By specifying the same link address, completely different sequences of microcode can invoke this same ROM line. As described above, the ROM lines also include a ROM address field allowing ROM lines to link themselves, thus allowing multiple external accesses to be made on sequential clock cycles.

Referring now to FIG. 4, an alternative embodiment of the invention that includes no onboard ROM or provision of ROM linking is depicted. In FIG. 4, the output of the MDATA latch 20 is coupled to an internal bus 80. The M2 control signal is coupled to the multiplexer M2 40 by M2 control line 44 and is also transmitted to an internal no-op line 82 via latches L8 and L9.

If the shared RAM array 12 is to perform some other function during clock cycle 2, then the MUX 42 is controlled to transfer the other function address to the address latch during phase A of clock cycle 2 by a bit in the preceding microinstruction. This control bit is delayed through latches L8 and L9 and is asserted on the internal no-op line 82 during phase B of clock cycle 2 when the other function data is latched into the MDATA latch 20. This no-op signal prevents the processor system 10 from executing the other function data as a microinstruction. For example, the no-op signal could be used to gate the other function data from the decoding circuitry.

The alternate system depicted in FIG. 4 is structurally simpler than the embodiment depicted in FIG. 1. However, because a no-op signal may be asserted during a given clock cycle, this embodiment may require more clock cycles to execute a given microprogram, thereby resulting in slower overall operation. Accordingly, the particular embodiment utilized will be determined by the requirements of the application to which the microprocessor is directed.

In both of the described embodiments, the microprogram counter 50 continues to increment the program counter address even if the program counter address is not sent to the shared RAM 12. Accordingly, the programmer must take care to skip a memory location in the control store section of the RAM if the RAM is to be utilized to perform some other function during the clock cycle when the skipped location would have been accessed.

The efficiency of the alternate embodiments of the invention will best be understood by considering the execution of a simple macroinstruction. In this example, a set of memory locations (assumed to be in the data cache) is summed and then the result is stored at some memory location labeled WrAddr. It is assumed that the data cache, the page table cache, and the microcode are stored in the shared memory array 12. The following table lists the various operations for the traditional non-shared configuration having separate memory arrays for storing the RAM and for storing the macrocode and other data, the shared configuration depicted in FIG. 4 having no onboard ROM or ROM linking capability, and the shared microRAM/microROM configuration depicted in FIG. 1.

|  | | NON-SHARED CONFIG. | | SHARED CONFIG. | | RAM/ROM CONFIG. |
| --- | --- | --- | --- | --- | --- | --- |
| CLK1 | PC: | Generate Cache Address; | PC: | Generate Cache Address; | PC: | Generate Cache Address. |
| CLK2 | PC+1: | Specify Mem Data Read; | PC+1: | Specify Mem Data Read; | PC+1: | Specify Mem Data Read, Link to ROM__003; |
| CLK3 | PC+2: | Increment Counter; | — | Internal NOP; - Mem Read | ROM Increment Counter; __003: | |
| CLK4 | PC+3: | Add Cache Data to Accum, If not __done GO TO PC; | PC+3: | Increment Counter | PC+3: | Add Cache Data to Accum. If not __done GO TO PC; |
| CLK5 | PC+4: | Generate Sum Store Addr; | PC+4: | Add Cache If not __done GO TO PC; | PC+4: | Generate Sum Addr; |
| CLK6 | PC+5: | Specify PT Cache Read, Write Data = Accum; | PC+5: | Generate Sum Store Addr; | PC+5: | Specify Page Table Cache. Write Data = Accum, Link to ROM__010; |
| CLK7 | PC+6: | Specify Write to WrAddr; | PC+6: | Specify PT Cache Read, Write Data = Accum; | ROM Write Sum to WrAdr, __010:Link to ROM__033; | |
| CLK8 | PC+7: | Start Next Operation; | — | Internal NOP; - PTC Read | ROM Start Next Operation; __033: | |
| CLK9 | | | PC+8: | Specify Write to WrAddr; | | |
| | | | — | Internal NOP; - Mem Write | | |
| CLK10 | | | PC+10: | Start Next Operation; | | |

A timing diagram showing the required accesses to external memory, the onboard ROM, and the execution of the accessed microinstructions are depicted in FIG. 5.

From the table and FIG. 5, it is apparent that the embodiment depicted in FIG. 1 is capable of the same performance as the traditional non-shared scheme. The simpler embodiment of FIG. 4 requires additional clock cycles to perform the same operation because of the inability to perform microcoded operations when other function data is resident in the MDATA latch 20.

In this embodiment, the PC is incremented every clock cycle regardless of whether microcode is accessed from the shared RAM array 12 or the onboard ROM 32. Thus, a PC is defined for every clock cycle and may be stored in a return stack register even if link address is being utilized to access a microinstruction.

The invention has now been described with reference to the preferred embodiments. Modifications and substitutions will now be apparent to persons of ordinary skill in the art. In particular, the timing scheme and latch control system is not critical to the invention. Multiphase or single phase clock signals with appropriate hardware modification could be used. Further, it is not required that the PC be incremented when microcode is accessed from the onboard ROM 32. The particular requirements of the CPu will dictate whether the PC is to be incremented. Accordingly, it is not intended that the invention be limited except as provided by the appended claims.

What is claimed is

1. In a digital system of the type that includes a processor for executing a program of macrocode instructions (macroinstructions), and a clock system for defining sequential clock cycles, where a given macroinstruction may require several clock cycles to execute and where the given macroinstruction is interpreted by an ordered sequence of microcode instructions (microinstructions) forming a microprogram, with the system also including a shared RAM array utilized to store the given macroinstruction, to store a given sequence of microinstructions for interpreting the given macroinstruction, and to perform other RAM functions such as accessing or updating a data cache, page table cache, or other types of tables of caches, a subsystem for accessing and executing the given sequence of microinstructions to interpret the given macroinstruction comprising:

- a read-only-memory (ROM), having an ADDRESS port, a DATA port, and a plurality of ROM storage locations and included in said processor, for storing selected ones of the microinstructions from the given sequence of microinstructions in a plurality of said ROM storage locations;
- means of accessing microinstructions in the given sequence of microinstructions from the shared RAM array to interpret the given macroinstruction during successive clock cycles when the shared RAM is not busy providing a macroinstruction or performing some other RAM function;
- means, responsive to a microinstruction accessed from said shared RAM array during a first given clock cycle, for generating an indication of whether said shared RAM array will be busy performing some other RAM function during a second given clock cycle subsequent to said first given clock cycle; and
- means, responsive to said indication, for accessing a given selected microinstruction from said ROM, during said second given clock cycle, if, during said second given clock cycle, the shared RAM is busy providing a macroinstruction or performing some other RAM function, with the given selected microinstruction being the microinstruction in the given sequence of microinstructions that otherwise would have been accessed from the shared RAM array during the second given clock cycle.

2. The invention of claim 1 wherein said means for accessing further comprises:

- a RAM microinstruction bus for transmitting a preceding microinstruction provided by said shared RAM;
- a ROM microinstruction bus for transmitting a preceding microinstruction accessed from said ROM;
- a multiplexer (MUX) having first and second input ports coupled to said ROM and RAM microinstruction buses, respectively, having a control port, and having an output port;
- an output microinstruction bus, including a plurality of lines, coupled to the output port of said MUX;
- a link bus, coupled to a first selected plurality of lines of said output microinstruction bus and to the ADR port of said ROM, for transferring the link field to the ROM ADR port; and
- a control bus, coupled to a second plurality of lines of said microinstruction bus and to the control port of said MUX, for transferring the control field to the MUX control port.

* * * * *